United States Patent
Floch et al.

(10) Patent No.: US 9,300,354 B2
(45) Date of Patent: Mar. 29, 2016

(54) RECEIVER FOR ACQUIRING AND TRACKING SPREAD SPECTRUM NAVIGATION SIGNALS WITH CHANGING SUBCARRIERS

(71) Applicant: Airbus DS GmbH, Taufkirchen (DE)

(72) Inventors: Jean-Jacques Floch, Munich (DE); Francis Soualle, Munich (DE); Jan Wendel, Munich (DE)

(73) Assignee: Airbus DS GmbH, Taufkirchen (DE)

( * ) Notice: Subject to any disclaimer, the term of this patent is extended or adjusted under 35 U.S.C. 154(b) by 0 days.

(21) Appl. No.: 14/625,280

(22) Filed: Feb. 18, 2015

(65) Prior Publication Data

US 2015/0236751 A1   Aug. 20, 2015

(30) Foreign Application Priority Data

Feb. 19, 2014 (EP) .................................... 14290042

(51) Int. Cl.
*H04B 1/00* (2006.01)
*H04B 1/713* (2011.01)
(Continued)

(52) U.S. Cl.
CPC ................ *H04B 1/713* (2013.01); *G01C 21/20* (2013.01); *H04B 1/707* (2013.01); *H04W 72/0453* (2013.01)

(58) Field of Classification Search
CPC ........ H04B 1/707; H04B 1/69; H04B 1/7143; H04B 1/7156; H04B 1/713; H04B 1/715; H04B 2001/7154
USPC .......................................... 375/130, 132–137
See application file for complete search history.

(56) References Cited

U.S. PATENT DOCUMENTS 5,428,358 A   6/1995  Gardner
5,574,754 A * 11/1996 Kurihara et al. .............. 375/367
(Continued)

FOREIGN PATENT DOCUMENTS

EP       1 292 043 A1    3/2003

OTHER PUBLICATIONS

Extended European Search Report dated Jul. 7, 2014 (Eight (8) pages).
(Continued)

*Primary Examiner* — Dac Ha
*Assistant Examiner* — Janice Tieu
(74) *Attorney, Agent, or Firm* — Crowell & Moring LLP

(57) ABSTRACT

A receiver acquires and tracks a spread spectrum navigation signal with changing subcarriers. The carrier signal changes between several subcarriers according to a hopping frequency and is modulated with data and a pseudorandom noise code signal. The receiver includes a carrier wipe off unit for down converting a received spread spectrum navigation signal from its carrier frequency to a baseband frequency, a frequency hopping wipe off unit for wiping off the hopping frequency from the received spread spectrum navigation signal, and a replica signal generation unit for generating at least one replica signal of the pseudorandom noise code signal for acquiring and tracking the received spread spectrum navigation signal after carrier wipe off. The generation of the at least one replica signal is performed depending on a sojourn time of the spread spectrum navigation signal at a subcarrier and a selected predetection integration time, and a correlation and integration unit correlates and integrates the received spread spectrum navigation signal after carrier wipe off with the at least one replica signal for the selected predetection integration time.

20 Claims, 4 Drawing Sheets

(51) Int. Cl.
*H04B 1/707* (2011.01)
*H04W 72/04* (2009.01)
*G01C 21/20* (2006.01)

(56) References Cited

U.S. PATENT DOCUMENTS

| | | | |
|---|---|---|---|
| 5,912,644 A * | 6/1999 | Wang | 342/457 |
| 6,215,810 B1 | 4/2001 | Park | |
| 2007/0160117 A1 * | 7/2007 | Nitta et al. | 375/145 |

OTHER PUBLICATIONS

Meng Shengyun et al., "Acquisition of DS/FH spread spectrum TTC signals in the presence of multitone jamming," Signal Processing (ICSP), Oct. 24, 2010, pp. 1608-1611, XP031817170, ISBN: 978-1-4244-5897-4.

Borio, D., "GNSS Acquisition in the Presence of Continuous Wave Interference," Transactions on Aerospace and Electronic Systems, vol. 46, No. 1, Jan. 1, 2010, pp. 47-60, XP011303233.

* cited by examiner

RECEIVER FOR ACQUIRING AND TRACKING SPREAD SPECTRUM NAVIGATION SIGNALS WITH CHANGING SUBCARRIERS

CROSS-REFERENCE TO RELATED APPLICATIONS

This application claims priority under 35 U.S.C. §119 to European application 14 290 042.2-1852, flied Feb. 19, 2014, the entire content of which is herein expressly incorporated by reference.

TECHNICAL FIELD

Exemplary embodiments of the invention generally relate to acquiring and tracking of spread spectrum navigation signals with changing subcarriers, particularly of Frequency Hopping (FH) CDMA (Code Division Multiple Access) signals for navigation purposes, and more particularly to a novel receiver architecture for acquiring and tracking of spread spectrum navigation signals with changing subcarriers.

BACKGROUND

Global Navigation Satellite Systems (GNSS) such as (NAVSTAR-)GPS (Global Positioning System) or the future European GNSS GALILEO use DSSS (Direct Sequence Spread Spectrum) modulation of the carrier frequencies reserved for the respective GNSS in order to transmit navigation data from the GNSS satellites of the space segment to GNSS receivers of the user segment. GPS and GALILEO commonly use the carrier frequencies L1 (1575.42 MHz) and L5 (1176.45 MHz). The DSSS modulation allows GNSS receivers to demodulate and decode the desired navigation signal on the carrier frequencies, which are commonly used by several GNSS satellites. The Russian GNSS GLONASS uses FDMA (Frequency Division Multiple Access) combined with CDMA so that each GLONASS satellite has its own two transmission frequencies for navigation signals. Regardless of the applied access technology, the navigation signals transmitted from GNSS satellites of GPS, GALILEO, and GLONASS are generally very weak at the receiver's location and, therefore vulnerable to jamming.

In mobile telecommunication systems, the use of FH combined with CDMA is applied in order to efficiently use the available resources for signal transmission. For example, the U.S. Pat. No. 6,215,810 B1 discloses a parallel hopping hybrid DS (Direct Sequence)/SFH (Slow Frequency Hopping) CDMA system, which combines the characteristics of a DS/CDMA, a FH/CDMA, a conventional CDMA and a multi-carrier CDMA system in order to be able to support more users of the system. FH has also been suggested as access technology for the transmission of navigation signals from GNSS satellites as being more resistant to multipath propagation.

FH has also some advantages with regard to jamming: if the sequence of hopping frequencies is unknown to unauthorized parties, it is significantly more difficult for these unauthorized parties to intercept the transmitted FH signals. Furthermore, the jamming of a FH signal is more demanding than the jamming of a signal with a constant carrier frequency: either, the hopping sequence must be known—which is usually not the case for unauthorized parties—in order to be able to tune the jamming signal accordingly, or the whole bandwidth within which the communication signal can be found must be jammed. This requires the emission of significantly more RF (Radio Frequency) power than for a constant carrier frequency, because the hopping frequencies can be chosen to cover a huge bandwidth, and increases the risk for the jammer to be detected. Thus, if navigation signals are transmitted as FH signals, these FH CDMA signals could be made less vulnerable to jamming. However, the processing of FH CDMA navigation signals requires a novel acquisition and tracking of these signals.

Noncoherent (slow and fast) frequency hopped spread spectrum signals, and hybrid and time hopping spread spectrum signals are introduced in chapter 1 of the book "Spread Spectrum Systems for GNSS and Wireless Communications", Jack K. Holmes. Artech House 2007. ISBN 978-1-59693-083-4.

SUMMARY OF INVENTION

Thus, exemplary embodiments of the present invention are directed to a receiver architecture for acquiring and tracking spread spectrum navigation signals with changing subcarriers, particularly FH CDMA signals for navigation purposes.

Exemplary embodiments of the invention are characterized by the fact that the predetection integration time required for acquiring and tracking a spread spectrum navigation signal with changing subcarriers can be chosen independently from the sojourn time at a certain hopping frequency. This is advantageous because it allows selection of the predetection integration time for navigation purposes in an optimized way, for example considering user environment and navigation message symbol durations: In weak signal conditions, a longer predetection integration time is beneficial, because the improvement in signal to noise ratio is proportional to the predetection integration time; the longer the predetection integration time, the weaker the signals can be while still be acquired and tracked. In addition, a longer predetection integration reduces the degradation due to multipath. On the other hand, a frequency offset between replica carrier and the carrier of the received signal causes degradation in the signal to noise ratio, which is also growing with the predetection integration time. This limits the maximum possible predetection integration time that can be chosen, depending, for example, on the user dynamics. Furthermore, without additional precautions, the predetection integration time must not exceed the duration of a navigation message symbol. The inventive receiver architecture offers full flexibility in the choice of the predetection navigation time, in order to allow for an optimal working point resulting from a trade-off of the effects described previously.

An embodiment of the invention relates to a receiver for acquiring and tracking a spread spectrum navigation signal with changing subcarriers, wherein the spread spectrum navigation signal has a carrier signal changing between several subcarriers according to a hopping frequency and being modulated with data and a pseudorandom noise code signal, wherein the receiver comprises a carrier wipe off unit for down converting a received spread spectrum navigation signal from its carrier frequency to a baseband frequency, a frequency hopping wipe off unit for wiping off the hopping frequency from the received spread spectrum navigation signal, a replica signal generation unit for generating at least one replica signal of the pseudorandom noise code signal for acquiring and tracking the received spread spectrum navigation signal after carrier wipe off, wherein the generation of the at least one replica signal is performed depending on a sojourn time $TH_i$ of the spread spectrum navigation signal at a subcarrier and a selected predetection integration time $T_{int}$, and a correlation and integration unit for correlating and integrating the received spread spectrum navigation signal after carrier wipe off with the at least one replica signal for the selected predetection integration time Tint.

The correlation and integration unit may be configured to select the predetection integration time Tint according to user environment and signal strength of the received navigation signals The replica signal generation unit may be configured to generate a replica signal if the predetection integration time Tint is smaller than or equal to the sojourn time THP at a subcarrier so that $T_{int} \leq T_{HP}$ according to $u_{replica}(t) = p(t-\hat{\tau}) \cdot c(t-\hat{\tau}) \cdot e^{-j2\pi \hat{f}_D(t-\hat{\tau})} \cdot e^{-j\hat{\theta}}$ wherein $\hat{\tau}$ is the estimated delay of the received spread spectrum navigation signal, $\hat{f}_D$ is the estimated Doppler frequency and $\hat{\theta}$ the estimated carrier phase of the received spread spectrum navigation signal, $f_H$ is the hopping frequency of the received spread spectrum navigation signal, $c(t-\hat{\tau})$ is the delayed pseudorandom noise code signal, and $p(t-\hat{\tau})$ is the pseudorandom noise code signal transmitted by a sender and convoluted with a pulse shaping function representing the influence of the transmission channel of the received spread spectrum navigation signal.

The replica signal generation unit may be configured to divide the selected predetection integration time Tint into m intervals if the predetection integration time Tint exceeds the sojourn time THP at a subcarrier so that Tint=m*THP, and to generate replica subsignals for each of the m intervals using the respective hopping frequency $f_{H,i}, i \in [1,m]$ and to generate a final replica signal by combining the replica subsignals of each of the m intervals.

The frequency hopping wipe off unit may be applied to a code generator of the replica signal generation unit.

Alternatively, the frequency hopping wipe off unit may be applied with the carrier wipe off unit.

As a further alternative, the frequency hopping wipe off unit may be applied with the carrier wipe off unit and after carrier and frequency hopping wipe off a received spread spectrum navigation signal is supplied to a digital band filter being configured to reject potential out of band interferences.

As yet another further alternative, the frequency hopping wipe off unit may be applied with the carrier wipe off unit and before carrier and frequency hopping wiping off a received spread spectrum navigation signal is supplied to a digital band filter being configured to reject potential out of band interferences.

The receiver can be also configured to anticipate phase jumps of a tracked spread spectrum navigation signal for each frequency hopping by calculating phase dispersion $\phi(f)[rad]$ caused by the impact of the ionosphere on the tracked spread spectrum navigation signal according to the following equation:

$$\varphi(f)[\text{rad}] = -2 \cdot \pi \cdot \frac{40.3 \cdot TEC[1/m^2]}{c[m/s] \cdot f[Hz]}$$

wherein TEC is the Total Electron Content of the ionosphere and f is the hopping frequency, and wherein the TEC is continuously evaluated with a two frequency receiver or received through communication means.

The receiver can be particularly configured to receive and process FH CDMA navigation signals as spread spectrum navigation signals with changing subcarriers.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DESCRIPTION OF EMBODIMENTS

Figure 1:
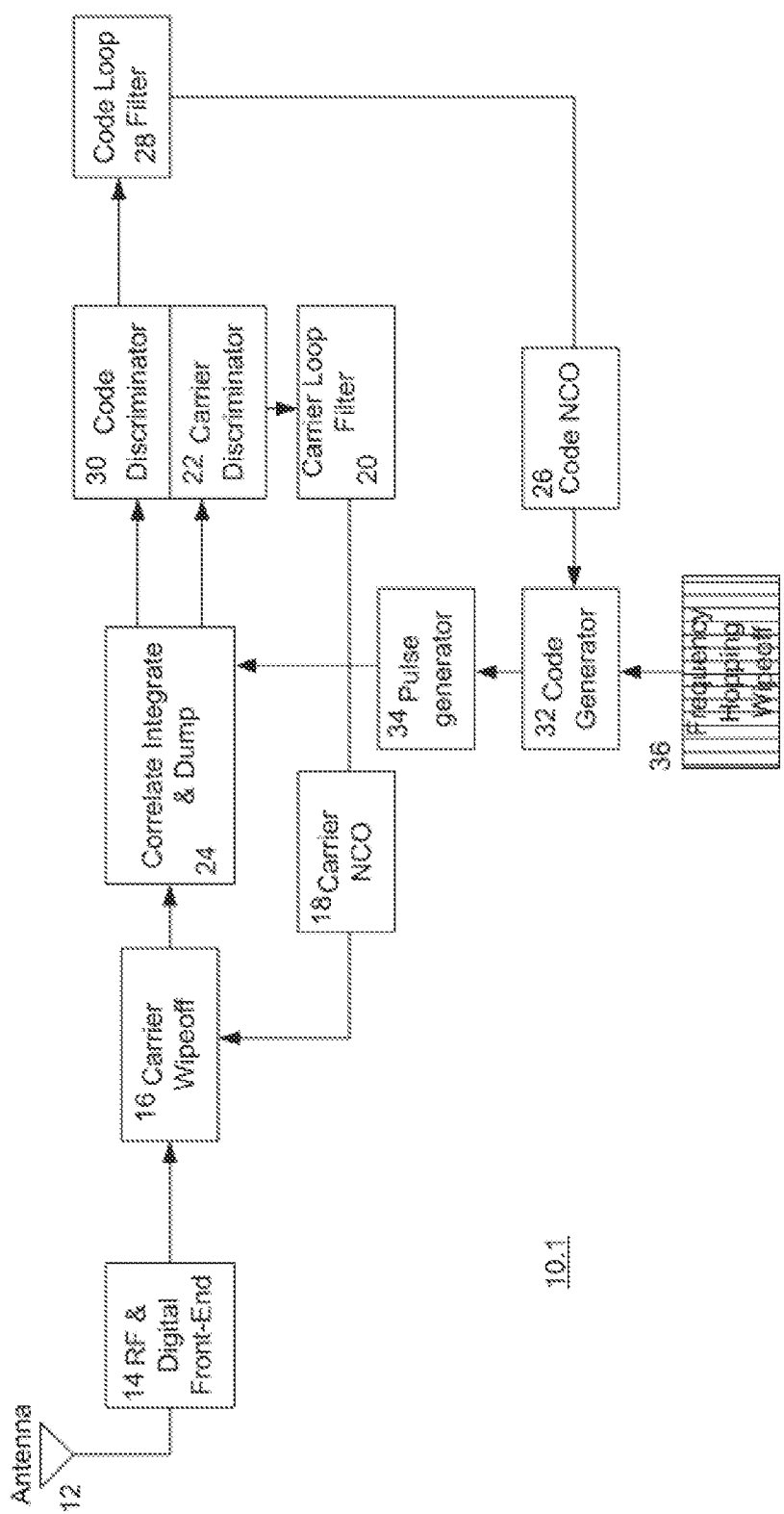
FIG. 1 shows a block diagram of a first embodiment of a receiver for FH CDMA navigation signals according to the invention.

In the following, functionally similar or identical elements may have the same reference numerals. Absolute values are shown below by way of example only and should not be construed as limiting the invention.

FIGS. 1 to 4 show different architectures of a GNSS receiver for receiving and digitally processing FH CDMA navigation signals as example of spread spectrum navigation signals with changing subcarriers transmitted by GNSS satellites according to the invention. A GNSS satellite generates a navigation signal by spreading the spectrum of a signal with navigation data with a pseudorandom noise code in order to generate a CDMA signal and, then, by modulating the generated CDMA signal on a high frequency carrier signal, which changes between several subcarriers according to a hopping frequency, which means that the carrier signal changes its subcarrier with the hopping frequency according to a predetermined hopping scheme.

The GNSS receivers 10.1-10.4 each comprise an antenna 12 for receiving the navigation signals of the GNSS satellites in view of the GNSS receiver. The signals received by the antenna 12 are forwarded to an RF & Digital Front-End 14, which amplifies the received navigation signals by a low noise preamplifier and digitizes the amplified navigation signals by Analog-Digital converters. The digitized navigation signals are then output for further processing in a digital receiver channel comprising a carrier and code tracking loop with carrier and frequency hopping wipe off according to the invention. In the following, the implementation of carrier and code tracking loops of all of the GNSS receiver architectures is described in detail.

The digitized navigation signal output from RF & Digital Front-End 18 is stripped of the carrier frequency by a carrier wipe off unit 16 or 17, which mixes the digitized navigation signal with a replica carrier signal generated by a carrier NCO (Numerical Controlled Oscillator) 18. The carrier NCO 18 is part of a PLL (Phase Locked Loop) or FLL (Frequency Locked Loop) comprising a Carrier Discriminator 22 and a Carrier Loop Filter 20 for generating a signal for controlling the generation of the replica carrier signal by the Carrier NCO 18 such that it matches the carrier frequency in frequency and phase. The carrier stripped of navigation signal in the baseband is then forwarded to a Correlate Integrate & Dump unit 24.

The Correlate Integrate & Dump unit 24 correlates the carrier stripped of navigation signal with replica codes (replicas) in order to acquire the navigation signal. The replicas are synthesised as follows: a Code NCO 26 generates a code clock containing the nominal spreading code chip rate. A Code Generator 32 generates a replica code based on the code clock. A Pulse generator 34 generates phase-delayed versions of the replica code, for example early and late, very early and very late and further replicas. Each of the generated replicas is correlated with the carrier stripped of navigation signal producing several versions of a code stripped off navigation signal in the baseband.

For tracking the acquired navigation signal, the Code NCO 26, the Code generator 32, and the Pulse generator 34 are parts of a DLL (Delay Locked Loop) comprising a Code Discriminator 30 and a Code Loop Filter 28, which detects any phase changes between the replicas and the carrier stripped of navigation signal and outputs the detected phase changes to the Code NCO 26 for changing the code clock accordingly.

The above described functions of acquisition and tracking of a navigation signal output from the RF & Digital Front-End 18 after down conversion to an IF and digitizing are commonly implemented in all of the different GNSS receiver architectures shown in FIGS. 1 to 4.

Figure 2:
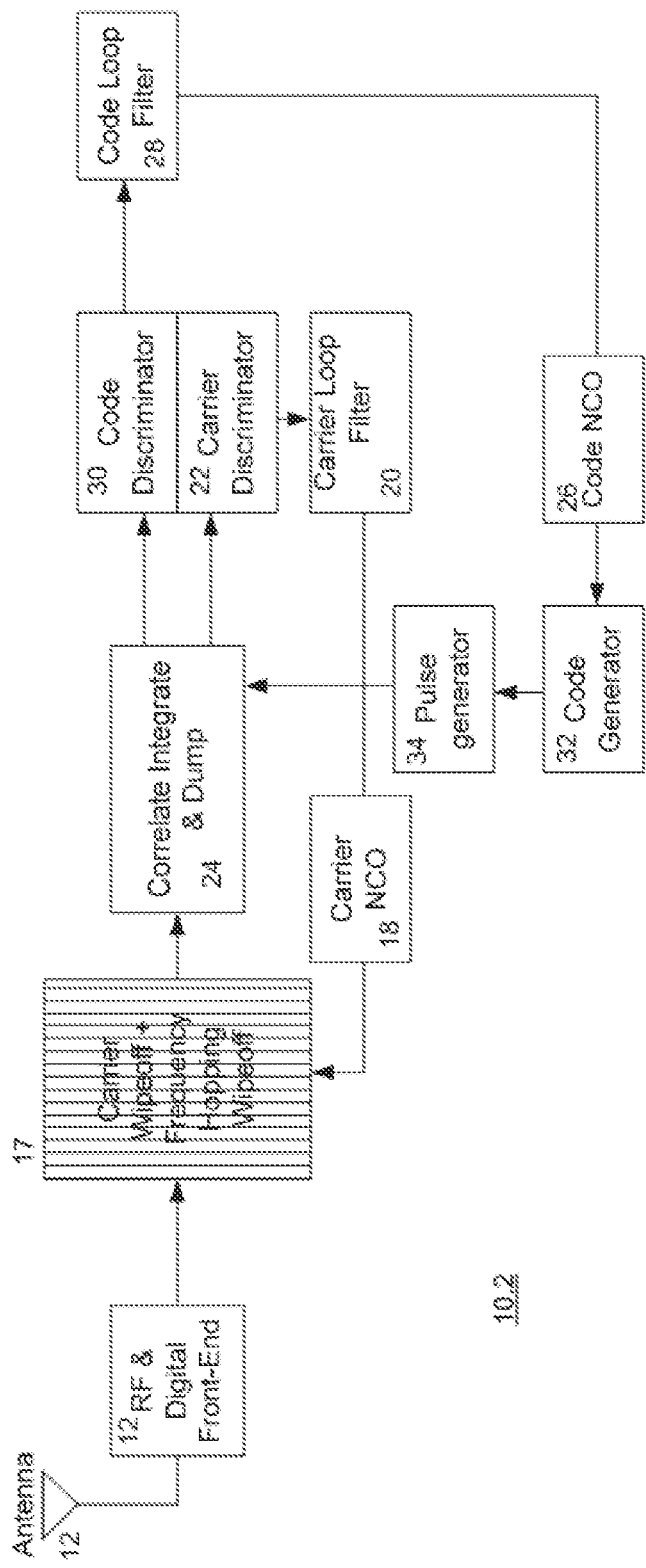
FIG. 2 shows a block diagram of a second embodiment of a receiver for FH CDMA navigation signals according to the invention.
Figure 3:
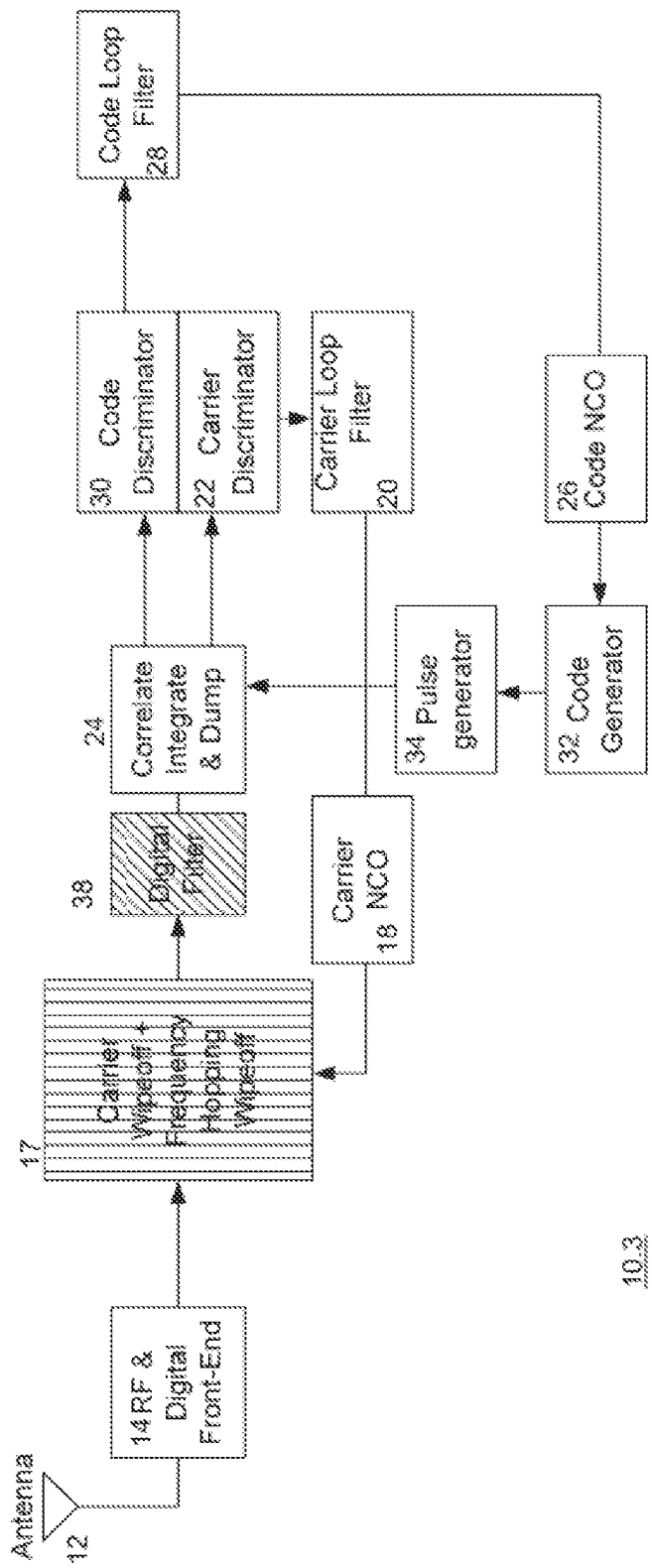
FIG. 3 shows a block diagram of a third embodiment of a receiver for FH CDMA navigation signals according to the invention.
Figure 4:
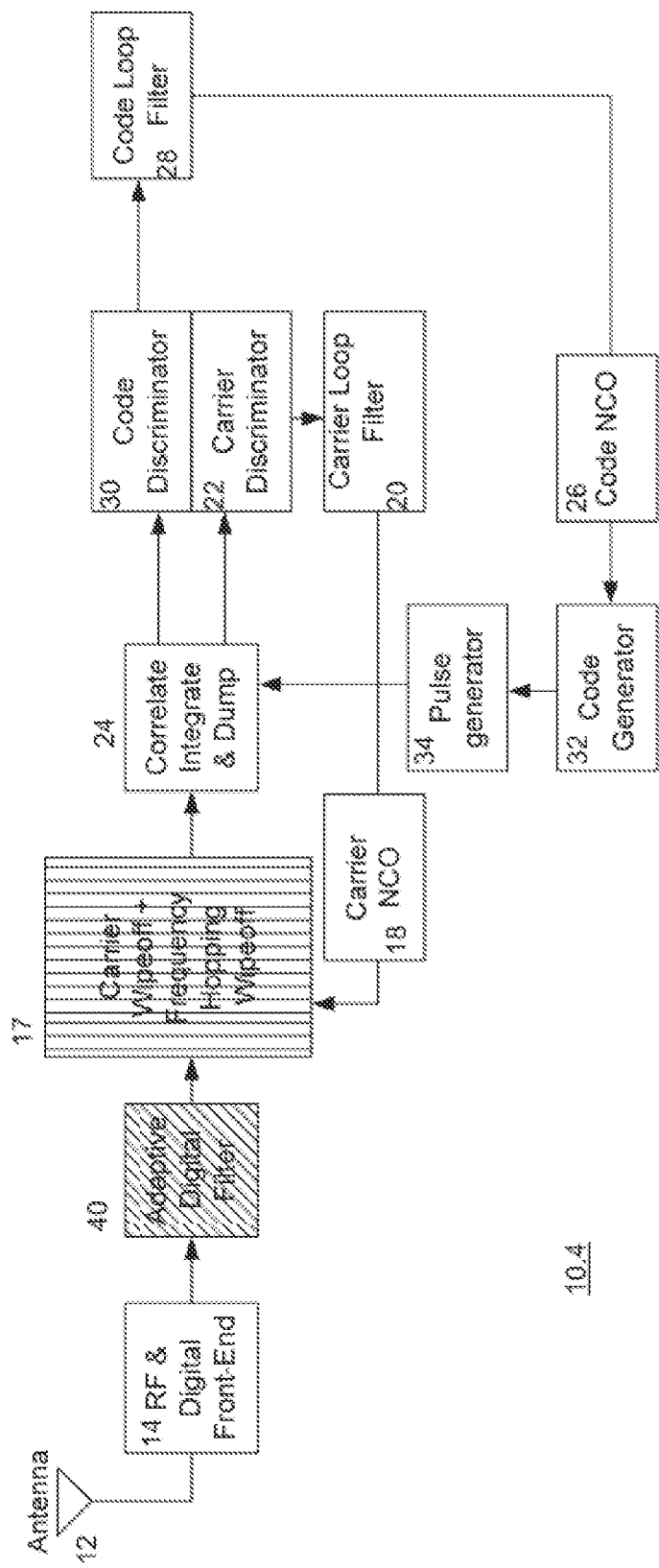
FIG. 4 shows a block diagram of a fourth embodiment of a receiver for FH CDMA navigation signals according to the invention.

In order to apply the frequency hopping wipe off during tracking, the four receiver architectures 10.1, 10.2, 10.3, and 10.4 differ as follows:

The frequency hopping wipe off is directly applied by means of a Frequency Hopping Wipe off unit 36 to the reference code generated by the Code Generator 32 in the receiver (receiver 10.1 shown in FIG. 1);

the frequency hopping wipe off is applied with the carrier wipe off in a Carrier Wipe off+Frequency Hopping Wipe Off unit 17 (receiver 10.2 shown in FIG. 2);

the frequency hopping wipe off is applied with the carrier wipe off in a Carrier Wipe off+Frequency Hopping Wipe Off unit 17; the signal is then digitally band filtered with a digital filter 38 to consider only the signal bandwidth of interest allowing rejecting potential out of band interferers (receiver 10.3 shown in FIG. 3);

the signal is digitally band filtered with an adaptive digital filter 40 to consider only the signal bandwidth of interest allowing rejecting potential out of band interferers, and then the frequency hopping wipe off is applied with the carrier wipe off in a Carrier Wipe off+Frequency Hopping Wipe Off unit 17 (receiver 10.4 shown in FIG. 4).

In the following, the predetection integration function performed by the Correlate Integrate & Dump unit 24 and the consideration of the frequency hopping of the received CDMA navigation signals with regard to the predetection integration function according to the invention is described in detail. The predetection integration function of the Correlate Integrate & Dump unit 24 is herein explained by means of a model of a received CDMA navigation signal with frequency hopping. The received frequency hopping combined with CDMA navigation signal u(t) at the GNSS receiver may be denoted as:

$$u(t) = p(t) \cdot c(t-\tau) e^{j(2\pi(f_0 + f_D(t))t + \theta)} + n(t) + MP(t)$$

wherein
$f_0$ is a nominal carrier frequency;
$f_H(t)$ is the offset of the hopping frequency from the nominal carrier frequency;
$f_D(t)$ is the Doppler frequency;
$\theta$ is the signal phase;
n(t) is the noise at the receiver;
MP(t) is the multipath component of the received signal.

In this signal model, p(t) is given by $p(t) = r(t) \circledast g(t)$, wherein r(t) is the PRN code, possibly multiplied by a subcarrier in case of BOC and BOCcos signals.
g(t) is a pulse shaping function, and
$\circledast$ denotes the convolutional operator.

Finally, c(t−τ) is the code (also referred to as the code signal) delayed by the transmission delay τ.

At baseband, i.e., at the output of carrier wipe off unit 16, the received signal can be expressed as:

$$u_{BB}(t) = p(t) \cdot c(t-\tau) e^{j(2\pi(f_H(t)+f_D(t))t+\theta)} + MP_{BB}(t)$$

For tracking purposes, this received signal has to be correlated with appropriate replicas generated by the Pulse generator 34 as described above, depending on the tracking technique that is used. In the following, the predetection integration time shall be denoted with $T^{int}$, the sojourn time at a hopping frequency is denoted with $T_{HP}$. For the sake of simplicity, $T_{HP}$ is assumed to be constant in the following, the extension to varying sojourn times is straight forward. Additionally, it is assumed that the predetection integration time is aligned with the frequency hopping intervals, the generalization dropping this assumption is straight forward as well.

In the inventive receiver architecture, two cases are distinguished for the generation of replica signals:

The predetection integration time is smaller than or equal to the sojourn time at a hopping frequency, i.e. $T_{int} \leq T_{HP}$:

A prompt replica of following form is used:

$$u_{replica}(t) = p(t-\hat{\tau}) \cdot c(t-\hat{\tau}) \cdot e^{-j2\pi\hat{f}_D(t-\hat{\tau})} \cdot e^{-j2\pi f_H(t-\hat{\tau})} \cdot e^{-j\hat{\theta}}$$

The construction of early and late, very early and very late and further replicas is obvious. Hereby, the estimated delay of the signal $\hat{\tau}$ is the result of the code or code and subcarrier tracking based on these replicas, typically in a DLL as described above. The estimated Doppler frequency $\hat{f}_D$ and carrier $\hat{\theta}$ phase result from a carrier tracking based on these replicas, typically in a PLL or FLL as described above. The difference to a conventional construction of replicas for a received signal that does not employ frequency hopping is, that the hopping frequency $f_H$, which is present during the predetection integration time period, has been directly included in the construction of the replicas.

The predetection integration time exceeds the sojourn time at a hopping frequency, i.e. $T_{int} > T_{HP}$:

The predetection integration time is divided into m intervals, so that $T_{int} = m \cdot T_{HP}$ holds. For each of the m intervals, the replicas are constructed in the same way as in the first case, the only difference is that now for each of the m intervals, the respective $f_{H,i}$, i∈[1,m] is used instead of one constant hopping frequency $f_H$ during the whole predetection integration time. The final replica is obtained by combining the replicas of each of the m intervals, yielding replicas of duration $T_{int}$.

These replicas can now be used in conjunction with any conventional tracking and acquisition technique used for BPSK (Binary Phase Shift Keying), BOC (Binary Offset Carrier), and multiplexed binary offset carrier (MBOC) signals, as if no frequency hopping would be present in the received signal. This technique can also be used for signals which employ additionally to the frequency hopping a time multiplexing of pilot and data, where this technique enables to correlate coherently over several subsequent pilot sequences. This technique can also be used for future new multilevel pulse shape signal.

During the tracking phase of a navigation signal transmitted from a GNSS satellite, the carrier phase tracking is always impacted by the Ionosphere. In addition, if the signal is transmitted with a frequency carrier hopping, the ionosphere can generate a non-predictable phase jump for each frequency hopping.

The Ionospheric group delay is defined by:

$$\tau(f)[m] = \frac{40.3 \cdot TEC[1/m^2]}{(f[Hz])^2}$$

wherein TEC=Total electronic content. Typical values are 1-100 TECU, with 1 TECU=$10^{16}$ electrons/$m^2$.

The phase dispersion can be expressed by the following equation:

$$\varphi(f)[rad] = -2 \cdot \pi \cdot \frac{40.3 \cdot TEC[1/m^2]}{c[m/s] \cdot f[Hz]}$$

The risk to get a cycle slip is therefore very high for a receiver working in L band for instance or in lower band. As many receivers, optimized for high dynamic, use the carrier adding algorithm, a cycle slip will generate a loss of lock.

A solution according to the invention to solve a non-predicted phase jump between two frequency hopping values is to evaluate the TEC through other means and therefore anticipate the phase jump using the above equation for phase dispersion. The TEC can be continuously evaluated with a two frequency receiver. Another way is to get the TEC is by having it communicated.

The invention allows correlating a received navigation signal employing frequency hopping with replica signals for a predetection integration time that is independent from the sojourn times at the hopping frequencies. This predetection integration time might or might not exceed the sojourn time at a hopping frequency. This allows selecting the optimal predetection integration time according to user environment and signal strength, yielding the best possible signal to noise ratio after correlation and the best possible multipath robustness.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMERALS AND ACRONYMS 10.1 first GNSS receiver architecture
10.2 second GNSS receiver architecture
10.3 third GNSS receiver architecture
10.4 fourth GNSS receiver architecture
12 antenna
14 RF & Digital Front-End
16 Carrier Wipe off unit
17 Carrier Wipe off+Frequency Hopping Wipe Off unit
18 Carrier NCO
20 Carrier Loop Filter
22 Carrier Discriminator
24 Correlate Integrate & Dump unit
26 Code NCO
28 Code Loop Filter
30 Code Discriminator
32 Code Generator
34 Pulse Generator
36 Frequency Hopping Wipe Off unit
38 digital filter
40 adaptive digital filter BOC Binary Offset Carrier
CDMA Code Division Multiple Access
DLL Delay Locked Loop
DS Direct Sequence
DSSS Direct Sequence Spread Spectrum
FDMA Frequency Division Multiple Access
FH Frequency Hopping
FLL Frequency Locked Loop
GNSS Global Navigation Satellite Systems
GPS Global Positioning System
MBOC multiplexed binary offset carrier
NCO Numerical Controlled Oscillator
PLL Phase Locked Loop
RF Radio Frequency
SFH Slow Frequency Hopping

What is claimed is:

1. A receiver for acquiring and tracking a spread spectrum navigation signal with changing subcarriers, wherein the spread spectrum navigation signal has a carrier signal changing between several subcarriers according to a hopping frequency and being modulated with data and a pseudorandom noise code signal, wherein the receiver comprises:
   a carrier wipe off unit configured to down convert a received spread spectrum navigation signal from its carrier frequency to a baseband frequency;
   a frequency hopping wipe off unit configured to wipe off the hopping frequency from the received spread spectrum navigation signal;
   a replica signal generation unit configured to generate at least one replica signal of the pseudorandom noise code signal for acquiring and tracking the received spread spectrum navigation signal after carrier wipe off, wherein the generation of the at least one replica signal is performed depending on a sojourn time $T_{Hi}$ of the spread spectrum navigation signal at a subcarrier and a selected predetection integration time $T_{int}$; and
   a correlation and integration unit configured to correlate and integrate the received spread spectrum navigation signal after carrier wipe off with the at least one replica signal for the selected predetection integration time $T_{int}$.

2. The receiver of claim 1, wherein the correlation and integration unit is configured to select the predetection integration time $T_{int}$ according to user environment and signal strength of the received spread spectrum navigation signal.

3. The receiver of claim 1, wherein the replica signal generation unit is configured to generate the at least one replica signal if the predetection integration time $T_{int}$ is smaller than or equal to the sojourn time $T_{HP}$ at a subcarrier so that $T_{int} \leq T_{HP}$, according to $u_{replica}(t) = p(t-\hat{\tau}) \cdot c(t-\hat{\tau}) \cdot e^{-j2\pi \hat{f}_D(t-\hat{\tau})} \cdot e^{-j\hat{\theta}}$ wherein $\hat{\tau}$ is an estimated delay of the received spread spectrum navigation signal, $\hat{f}_D$ is an estimated Doppler frequency and $\hat{\theta}$ is an estimated carrier phase of the received spread spectrum navigation signal, $f_H$ is the hopping frequency of the received spread spectrum navigation signal, $c(t-\hat{\tau})$ is a delayed pseudorandom noise code signal, and $p(t-\hat{\tau})$ is the pseudorandom noise code signal transmitted by a sender and convoluted with a pulse shaping function representing an influence of transmission channel of the received spread spectrum navigation signal.

4. The receiver of claim 1, wherein the replica signal generation unit is configured to divide the selected predetection integration time $T_{int}$ into m intervals if the predetection integration time $T_{int}$ exceeds the sojourn time $T_{HP}$ at a subcarrier so that $T_{int} = m \cdot T_{HP}$, and to generate replica subsignals for each of the m intervals using respective hopping frequency $f_{H,i}$, $i \in [1,m]$ and to generate a final replica signal by combining the replica subsignals of each of the m intervals.

5. The receiver of claim 1, wherein the frequency hopping wipe off unit is applied to a code generator of the replica signal generation unit.

6. The receiver of claim 1, wherein the frequency hopping wipe off unit is applied with the carrier wipe off unit.

7. The receiver of claim 1, wherein the frequency hopping wipe off unit is applied with the carrier wipe off unit and after carrier and frequency hopping wipe off the received spread spectrum navigation signal is supplied to a digital band filter configured to reject potential out of band interferences.

8. The receiver of claim 1, wherein the frequency hopping wipe off unit is applied with the carrier wipe off unit and before carrier and frequency hopping wiping off the received spread spectrum navigation signal is supplied to a digital band filter being configured to reject potential out of band interferences.

9. The receiver of claim 1, wherein the receiver is configured to anticipate phase jumps of a tracked spread spectrum navigation signal for each frequency hopping by calculating phase dispersion φ(f)[rad] caused by an impact of an ionosphere on the tracked spread spectrum navigation signal according to the following equation:

$$\varphi(f)[\text{rad}] = -2 \cdot \pi \cdot \frac{40.3 \cdot TEC[1/m^2]}{c[m/s] \cdot f[Hz]}$$

wherein TEC is a Total Electron Content of the ionosphere, m is meters, c[m/s] is the speed of light in meters per second, and f is the hopping frequency, and wherein the TEC is continuously evaluated with a two frequency receiver or received through communication.

10. The receiver of claim 1, wherein the receiver is configured to receive and process frequency hopping (FH) Code Division Multiple Access (CDMA) navigation signals as spread spectrum navigation signals with changing subcarriers.

11. A method for receiver to acquire and track a spread spectrum navigation signal with changing subcarriers, wherein the spread spectrum navigation signal has a carrier signal changing between several subcarriers according to a hopping frequency and being modulated with data and a pseudorandom noise code signal, wherein the method comprises:
   down converting, by a carrier wipe off unit, a received spread spectrum navigation signal from its carrier frequency to a baseband frequency;
   wiping off, by a frequency hopping wipe off unit the hopping frequency from the received spread spectrum navigation signal;
   generating, by a replica signal generation unit, at least one replica signal of the pseudorandom noise code signal for acquiring and tracking the received spread spectrum navigation signal after carrier wipe off, wherein the generation of the at least one replica signal is performed depending on a sojourn time $T_{HP}$ of the spread spectrum navigation signal at a subcarrier and a selected predetection integration time $T_{int}$, and
   correlating and integrating, by a correlation and integration unit, the received spread spectrum navigation signal after carrier wipe off with the at least one replica signal for the selected predetection integration time $T_{int}$.

12. The method of claim 11, wherein the correlation and integration unit selects the predetection integration time $T_{int}$ according to user environment and signal strength of the received spectrum navigation signal.

13. The method of claim 11, wherein the replica signal generation unit generates the at least one replica signal if the predetection integration time $T_{int}$ is smaller than or equal to the sojourn time $T_{HP}$ at a subcarrier so that $T_{int} \leq T_{HP}$ according to $u_{replica}(t) = p(t-\hat{\tau}) \cdot c(t-\hat{\tau}) \cdot e^{-j2\pi\hat{f}_D(t-\hat{\tau})} \cdot e^{-j\hat{\theta}}$ wherein $\hat{\tau}$ is an estimated delay of the received spread spectrum navigation signal, $\hat{f}_D$ is an estimated Doppler frequency and $\hat{\theta}$ is an estimated carrier phase of the received spread spectrum navigation signal, $f_H$ is the hopping frequency of the received spread spectrum navigation signal, $c(t-\hat{\tau})$ is a delayed pseudorandom noise code signal, and $p(t-\hat{\tau})$ is the pseudorandom noise code signal transmitted by a sender and convoluted with a pulse shaping function representing an influence of transmission channel of the received spread spectrum navigation signal.

14. The method of claim 11, wherein the replica signal generation unit divides the selected predetection integration time $T_{int}$ into m intervals if the predetection integration time $T_{int}$ exceeds the sojourn time $T_{HP}$ at a subcarrier so that $T_{int} = m^* T_{HP}$, and to generate replica subsignals for each of the m intervals using respective hopping frequency $f_{H,i}$, i∈[1, m] and to generate a final replica signal by combining the replica subsignals of each of the m intervals.

15. The method of claim 11, wherein the frequency hopping wipe off unit is applied to a code generator of the replica signal generation unit.

16. The method of claim 11, wherein the frequency hopping wipe off unit is applied with the carrier wipe off unit.

17. The method of claim 11, wherein the frequency hopping wipe off unit is applied with the carrier wipe off unit and after carrier and frequency hopping wipe off the received spread spectrum navigation signal is supplied to a digital band filter configured to reject potential out of band interferences.

18. The method of claim 11, wherein the frequency hopping wipe off unit is applied with the carrier wipe off unit and before carrier and frequency hopping wiping off the received spread spectrum navigation signal is supplied to a digital band filter being configured to reject potential out of band interferences.

19. The method of claim 11, wherein the receiver is configured to anticipate phase jumps of a tracked spectrum navigation signal for each frequency hopping by calculating phase dispersion Φ(f)[rad] caused by an impact of an ionosphere on the tracked spread spectrum navigation signal according to the following equation:

$$\varphi(f)[\text{rad}] = -2 \cdot \pi \cdot \frac{40.3 \cdot TEC[1/m^2]}{c[m/s] \cdot f[Hz]}$$

wherein TEC is a Total Electron Content of the ionosphere, m is meters, c[m/s] is the speed of light in meters per second, and f is the hopping frequency, and wherein the TEC is continuously evaluated with a two frequency receiver or received through communication.

20. The method of claim 11, wherein the receiver receives and processes frequency hopping (FH) Code Division Multiple Access (CDMA) navigation signals as spread spectrum navigation signals with changing subcarriers.

* * * * *